(12) United States Patent
Chiu

(10) Patent No.: US 12,425,829 B2
(45) Date of Patent: Sep. 23, 2025

(54) METHOD FOR PAIRING DEVICES, ELECTRONIC SYSTEM, AND COMPUTER READABLE STORAGE MEDIUM

(71) Applicant: HTC Corporation, Taoyuan (TW)

(72) Inventor: Wei-Cheng Chiu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 540 days.

(21) Appl. No.: 17/736,099

(22) Filed: May 4, 2022

(65) Prior Publication Data

US 2023/0232200 A1 Jul. 20, 2023

Related U.S. Application Data

(60) Provisional application No. 63/299,418, filed on Jan. 14, 2022.

(51) Int. Cl.
*H04W 8/00* (2009.01)
*H04W 4/80* (2018.01)
*H04W 76/14* (2018.01)

(52) U.S. Cl.
CPC ............ *H04W 8/005* (2013.01); *H04W 4/80* (2018.02); *H04W 76/14* (2018.02)

(58) Field of Classification Search
CPC ........ H04W 8/005; H04W 76/14; H04W 4/80
See application file for complete search history.

(56) References Cited

U.S. PATENT DOCUMENTS

| 8,849,200 | B2 * | 9/2014 | Svensson | H04W 12/50 345/158 |
| 11,045,723 | B1 * | 6/2021 | Lee | A63F 13/24 |
| 11,128,636 | B1 * | 9/2021 | Jorasch | G06F 3/0346 |
| 2014/0149859 | A1 * | 5/2014 | Van Dyken | G06F 3/017 715/702 |
| 2017/0093822 | A1 * | 3/2017 | Gutierrez | H04W 4/80 |
| 2017/0201931 | A1 * | 7/2017 | Swanzey | A61B 5/002 |

(Continued)

FOREIGN PATENT DOCUMENTS

| CN | 105303790 | 2/2016 |
| CN | 108601002 | 9/2018 |

(Continued)

OTHER PUBLICATIONS

"Office Action of Taiwan Counterpart Application", issued on Sep. 28, 2022, pp. 1-9.

*Primary Examiner* — Christopher B Robinson
*Assistant Examiner* — Angela Widhalm De Rodriguez
(74) *Attorney, Agent, or Firm* — JCIPRNET

(57) ABSTRACT

The embodiments of the disclosure provide a method for pairing devices, an electronic system, and a computer readable storage medium. The method includes: in response to determining a pairing function of a host is triggered, scanning, by the host, for at least one broadcast signal transmitted by at least one electronic device; in response to determining that a first broadcast signal from a first electronic device is scanned, establishing, by the host, a first connection with the first electronic device; providing, by the host, a first operation hint; receiving, by the host, a first operation information from the first electronic device through the first connection; and in response to determining that the first operation information corresponds to the first operation hint, pairing, by the host, with the first electronic device.

15 Claims, 3 Drawing Sheets

(56) References Cited

U.S. PATENT DOCUMENTS

| | | | | |
|---|---|---|---|---|
| 2017/0262045 | A1* | 9/2017 | Rouvinez | G06F 3/011 |
| 2018/0213583 | A1* | 7/2018 | Al-Ali | A61B 5/6833 |
| 2018/0256976 | A1* | 9/2018 | McHale | A63F 13/525 |
| 2019/0050547 | A1* | 2/2019 | Welsh | G06Q 10/10 |
| 2021/0110591 | A1* | 4/2021 | Yokokawa | G06F 3/012 |
| 2021/0141444 | A1 | 5/2021 | Speelman et al. | |

FOREIGN PATENT DOCUMENTS

| | | |
|---|---|---|
| CN | 108616655 | 10/2018 |
| CN | 113271576 | 8/2021 |
| CN | 113347618 | 9/2021 |

\* cited by examiner

METHOD FOR PAIRING DEVICES, ELECTRONIC SYSTEM, AND COMPUTER READABLE STORAGE MEDIUM

CROSS-REFERENCE TO RELATED APPLICATION

This application claims the priority benefit of U.S. provisional application Ser. No. 63/299,418, filed on Jan. 14, 2022. The entirety of the above-mentioned patent application is hereby incorporated by reference herein and made a part of this specification.

BACKGROUND

1. Field of the Invention

The present disclosure generally relates to managing devices, in particular, to a method for pairing devices, an electronic system, and a computer readable storage medium.

2. Description of Related Art

Nowadays, it common for a user to be immersed in a virtual reality (VR) world by wearing a head mounted display (HMD). When using the VR services provided by the HMD, the user can interact with the VR world via, for example, hand gestures and/or some accessory devices (e.g., handheld controllers or some trackers attachable to other to-be-tracked objects).

Before the user uses the accessory devices to interact with the VR world, the accessory devices need to be paired with the HMD. However, the conventional way for the user to pair the accessory devices with the HMD is inconvenient.

For example, when the user wants to pair a handheld controller with the HMD, the user needs to simultaneously press some particular physical buttons on the handheld controller to trigger the pairing mechanism between the handheld controller and the HMD. In this case, the user may need to switch the HMD to a see-through mode to visually check whether the buttons on the handheld controller are correctly pressed, which disrupts the immersive VR experience of the user.

In addition, since there are multiple physical buttons on the to-be-paired handheld controller need to be simultaneously pressed, the user may need to use both hands to press these buttons, such that the user may have to put down the other handheld device (e.g., the other handheld controller) for facilitating the pressing of buttons on the to-be-paired handheld controller.

SUMMARY OF THE INVENTION

Accordingly, the disclosure is directed to a method for pairing devices, an electronic system, and a computer readable storage medium, which may be used to solve the above technical problems.

The embodiments of the disclosure provide a method for pairing devices. The method includes: in response to determining a pairing function of a host is triggered, scanning, by the host, for at least one broadcast signal transmitted by at least one electronic device; in response to determining that a first broadcast signal from a first electronic device is scanned, establishing, by the host, a first connection with the first electronic device; providing, by the host, a first operation hint; receiving, by the host, a first operation information from the first electronic device through the first connection; and in response to determining that the first operation information corresponds to the first operation hint, pairing, by the host, with the first electronic device.

The embodiments of the disclosure provide an electronic system including a host. The host is configured to perform: in response to determining a pairing function of a host is triggered, scanning for at least one broadcast signal transmitted by at least one electronic device; in response to determining that a first broadcast signal from a first electronic device is scanned, establishing a first connection with the first electronic device; providing a first operation hint; receiving a first operation information from the first electronic device through the first connection; and in response to determining that the first operation information corresponds to the first operation hint, pairing with the first electronic device.

The embodiments of the disclosure provide a computer readable storage medium, the computer readable storage medium recording an executable computer program, the executable computer program being loaded by a host to perform steps of: in response to determining a pairing function of a host is triggered, scanning for at least one broadcast signal transmitted by at least one electronic device; in response to determining that a first broadcast signal from a first electronic device is scanned, establishing a first connection with the first electronic device; providing a first operation hint; receiving a first operation information from the first electronic device through the first connection; and in response to determining that the first operation information corresponds to the first operation hint, pairing with the first electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
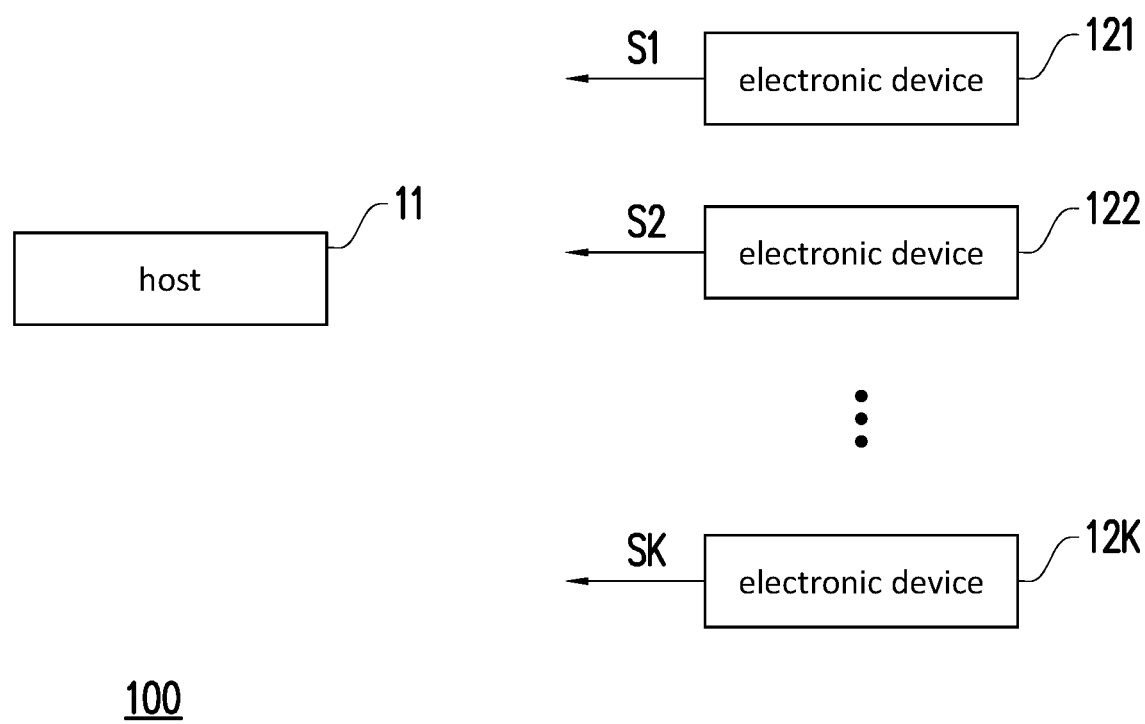
FIG. 1 shows a schematic diagram of an electronic system according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of an electronic system according to an embodiment of the disclosure. In FIG. 1, the electronic system 100 includes a host 11 and electronic devices 121-12K. In various embodiments, the host 11 can be any smart device and/or computer device that can be paired with the electronic devices 121-12K via communication protocols (e.g., wireless fidelity (Wi-Fi) and/or Bluetooth, etc.). In one embodiment, the host 11 can be an HMD that is capable of providing reality services such as VR services, augmented reality (AR) services and the like.

In the embodiments of the disclosure, the host 11 includes a storage circuit and a processor. The storage circuit is one or a combination of a stationary or mobile random access memory (RAM), read-only memory (ROM), flash memory, hard disk, or any other similar device, and which records a plurality of modules that can be executed by the processor.

The processor may be coupled with the storage circuit, and the processor may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, each electronic device 121-12K can be any wearable device and/or handheld device that can be paired with the host 11, such as a smart ring, a smart bracelet, a smart watch, a handheld controller, or the like. In some embodiments, the electronic devices 121-12K can be trackers for being attached to some to-be-tracked objects, but the disclosure is not limited thereto. For facilitating the following discussions, the host 11 would be assumed to be the HMD for providing VR services, but the disclosure is not limited thereto.

In the embodiments of the disclosure, the electronic devices 121-12K can be configured to broadcast the corresponding broadcast signals S1-SK for pairing, wherein each broadcast signal S1-SK carries the identification information of the corresponding electronic device 121-12K.

In one embodiment, when the user wants to pair one of the electronic devices 121-12K (referred to as a first electronic device) with some devices (e.g., the host 11), the user may trigger the first electronic device to broadcast the corresponding broadcast signal (referred to as a first broadcast signal) that carries the identification information of the first electronic device. For example, if the user wants to pair the electronic device 121 with the host 11, the user may trigger the electronic device 121 to broadcast the corresponding broadcast signal S1, which carries the identification information of the electronic device 121. For another example, if the user wants to pair the electronic device 12K with the host 11, the user may trigger the electronic device 12K to broadcast the corresponding broadcast signal SK, which carries the identification information of the electronic device 12K, but the disclosure is not limited thereto.

In one embodiment, if the used pairing protocol of the first electronic device is Wi-Fi, the first broadcast may carry the Wi-Fi Internet protocol (IP) address of the first electronic device. In another embodiment, if the used pairing protocol of the first electronic device is Bluetooth, the first broadcast may carry the Bluetooth medium access control (MAC) address of the first electronic device, but the disclosure is not limited thereto.

In one embodiment, the first electronic device can be configured to broadcast the first broadcast after the booting procedure thereof is finished. In other embodiments, the first electronic device can be configured with a particular button for the user to trigger the first electronic device to broadcast the first broadcast signal. For example, the user may press the particular button for several times with a predetermined time length to trigger the first electronic device to broadcast the first broadcast signal. For another example, the user may press and hold the particular button for the predetermined time length to trigger the first electronic device to broadcast the first broadcast signal, but the disclosure is not limited thereto.

In the embodiments of the disclosure, the processor of the host 11 may access the modules stored in the storage circuit of the host 11 to implement the method for pairing devices provided in the disclosure, which would be further discussed in the following.

Figure 2:
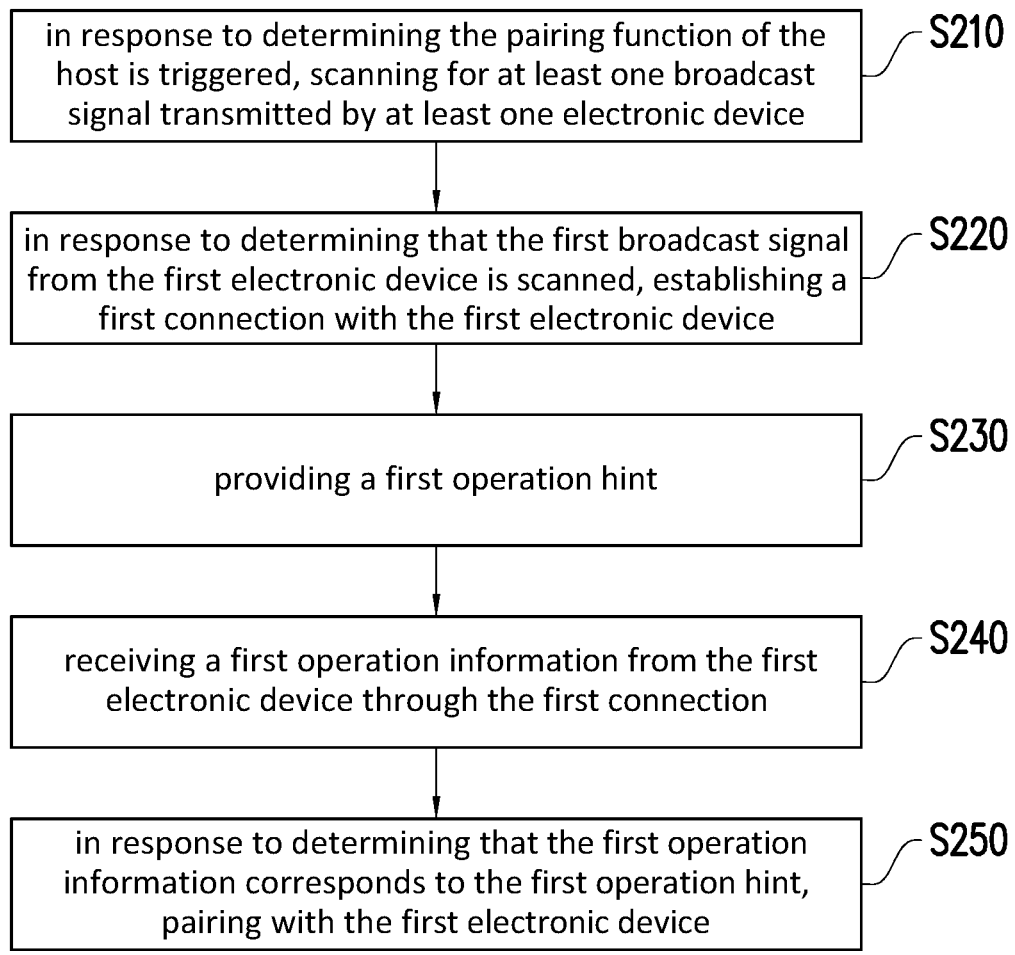
FIG. 2 shows a flow chart of the method for pairing devices according to an embodiment of the disclosure.

See FIG. 2, which shows a flow chart of the method for pairing devices according to an embodiment of the disclosure. The method of this embodiment may be executed by the host 11 in FIG. 1, and the details of each step in FIG. 2 will be described below with the components shown in FIG. 1.

In the embodiments of the disclosure, the host 11 can determine whether a pairing function of the host 11 is triggered. In one embodiment, the pairing function of the host 11 can be automatically triggered after the booting procedure thereof is finished. In other embodiments, the host 11 can be configured with a pairing button for the user to trigger the pairing function of the host 11. For example, the user may press the pairing button for several times with a predetermined time length to trigger the pairing function of the host 11. For another example, the user may press and hold the pairing button for the predetermined time length to trigger the pairing function of the host 11, but the disclosure is not limited thereto.

In step S210, in response to determining the pairing function of the host 11 is triggered, the host 11 scans for at least one broadcast signal transmitted by at least one electronic device. In the embodiments of the disclosure, assuming that all of the electronic devices 121-12K are broadcasting the corresponding broadcast signals S1-SK, but the disclosure is not limited thereto. In this case, the host 11 may determine that the broadcast signals S1-SK are scanned by the host 11.

In the embodiments of the disclosure, the host 11 can perform similar operations to each of the electronic devices 121-12K in response to determining that the corresponding broadcast signals S1-SK are scanned by the host 11. Therefore, the first electronic device (i.e., one of the electronic devices 121-12K) would be used as an example for explaining the concept of the disclosure, but the disclosure is not limited thereto.

In step S220, in response to determining that the first broadcast signal from the first electronic device is scanned, the host 11 establishes a first connection with the first electronic device. In one embodiment, the first connection between the first electronic device and the host 11 can be understood as a dedicated channel for the first electronic device and the host 11 to perform data exchange with each other, and the protocols for establishing the first connection may be wireless communication protocols such Wi-fi, Bluetooth, and/or the like.

In one embodiment, the first electronic device can be disposed with one or more motion detection elements (e.g., inertial measurement units (IMU)) for detecting the motion data (e.g., 6 degree of freedom (6DOF) data) of the first electronic device. In this case, the host 11 may receive the detected motion data from the first electronic device through the first connection after the first connection between the first electronic device and the host 11 is established, but the disclosure is not limited thereto.

In the embodiments of the disclosure, since the broadcast signals S1-SK are all assumed to be scanned by the host 11, the host 11 may establish a connection with each of the electronic devices 121-12K.

In step S230, the host 11 provides a first operation hint. In the embodiments of the disclosure, the first operation hint can be a visual and/or audio hint provided by the HMD to the user for instructing the user to do some specific movements and/or operations.

In one embodiment, if the host 11 wants to pair with a specific electronic device corresponding to a first object part, the host 11 may use the first operation hint to instruct the user to do some specific movements and/or operations with the specific electronic device and/or the first object part. Noted that the host 11 does not know which one of the electronic devices 121-12K is the specific electronic device at this time, and hence the host 11 may perform the following procedure to determine which one of the electronic devices 121-12K is the specific electronic device corresponding to the first object part.

In various embodiments, the host 11 may use the first operation hint to instruct the user to: (1) move the specific electronic device according to a specific moving pattern (e.g., waiving the specific electronic device); (2) press one specific button on the specific electronic device; and/or (3) perform a specific operation to a camera of the specific electronic device (e.g., covering the camera of the specific electronic device), but the disclosure is not limited thereto.

For example, assuming that the first object part is the right hand of the user of the host 11, and the to-be-paired specific electronic device is a handheld controller in the right hand of the user, the first operation hint can be used to instruct the user to waive the right hand thereof, to press one specific button on the handheld controller in the right hand, and/or to cover the camera of the handheld controller in the right hand, but the disclosure is not limited thereto.

In this case, the specific electronic device (which is assumed to be one of the electronic devices 121-12K) would provide corresponding operation information to the host 11 via the connection between the specific electronic device and the host 11. For example, if the first operation hint instructs the user to move the specific electronic device according to the specific moving pattern, the specific electronic device (and others of the electronic devices 121-12K) may provide the motion data as the operation information to the host 11. If the first operation hint instructs the user to press one specific button on the specific electronic device, the specific electronic device (and others of the electronic devices 121-12K) may provide the button event as the operation information to the host 11. If the first operation hint instructs the user to perform the specific operation to the camera of the specific electronic device, the specific electronic device (and others of the electronic devices 121-12K) may provide the images captured by the camera thereof to the host 11.

Since the host 11 has established the connection with each of the electronic devices 121-12K, the host 11 can receive the operation information of each of the electronic devices 121-12K via the corresponding connection.

Therefore, in step S240, the host 11 receives a first operation information from the first electronic device through the first connection.

In one embodiment, if the host 11 determines that the operation information of a certain electronic device of the electronic devices 121-12K corresponds to the first operation hint, the host 11 can know that this certain electronic device is the specific electronic device and accordingly pair with this certain electronic device.

Therefore, after receiving the first operation information from the first electronic device, the host 11 determines whether the first operation information corresponds to the first operation hint.

In the embodiment where the first operation information is the motion data detected by the first electronic device, the host 11 may determine whether the moving pattern formed by the motion data of the first electronic device matches and/or corresponds to the specific moving pattern instructed by the first operation hint. If yes, it represents that the first electronic device is the specific electronic device relates or corresponds to the first object part. On the other hand, if the moving pattern formed by the motion data of the first electronic device does not match and/or correspond to the specific moving pattern instructed by the first operation hint, it represents that the first electronic device is not the specific electronic device relates or corresponds to the first object part.

In the embodiment where the first operation information is the button event detected by the first electronic device, the host 11 may determine whether the button event indicates that a second specific button on the first electronic device is triggered, wherein the second specific button on the first electronic device corresponds to the first specific button on the specific electronic that the user pressed according to the first operation hint. If yes, it represents that the first electronic device is the specific electronic device relates or corresponds to the first object part. On the other hand, if the button event indicates that the second specific button on the first electronic device is not triggered as instructed by the first operation hint, it represents that the first electronic device is not the specific electronic device relates or corresponds to the first object part.

In the embodiment where the first operation information is the images captured by a first camera of the first electronic device, the host 11 can perform an image recognition on the images provided by the first electronic device and determine whether a result of the image recognition indicates that an operation performed to the first camera corresponds to the specific operation as instructed by the first operation hint. If yes, it represents that the first electronic device is the specific electronic device relates or corresponds to the first object part. On the other hand, if the result of the image recognition indicates that the operation performed to the first camera does not correspond to the specific operation as instructed by the first operation hint, it represents that the first electronic device is not the specific electronic device relates or corresponds to the first object part.

Accordingly, in step S250, in response to determining that the first operation information corresponds to the first operation hint, the host 11 pairs with the first electronic device. In addition, the host 11 can further determine whether the first operation hint relates to the first object part. For example, the host 11 can determine whether the first operation hint involves instructing the first object part to do some operations and/or movements. If yes, the host 11 can determine that the first operation hint relates to the first object part, and vice versa.

In one embodiment, in response to determining that the first operation hint relates to the first object part corresponding to the specific electronic device, the host 11 assigns the first electronic device to be corresponding to the first object part or the specific electronic device.

For example, if the first operation hint instructs the user to waive the handheld controller (i.e., the specific electronic device) in the right hand (i.e., the first object part) thereof, and the first electronic device is determined to be the specific electronic device, the host 11 can assign the first electronic device to be corresponding to the right hand of the user and/or the handheld controller in the right hand of the user, but the disclosure is not limited thereto.

In one embodiment, the visual content (e.g., the VR content) provided to the user of the host 11 may include a VR avatar, wherein the VR avatar has a body part (e.g., right hand) corresponding to the first object part, and the this body part can be controlled by the user 399 via the first electronic device. In this case, after the host 11 assigning the first electronic device to be corresponding to the first object part, the user 399 can control the body part of the VR avatar via moving the first electronic device, but the disclosure is not limited thereto.

Accordingly, the embodiments of the disclosure provide a novel and convenient way to pair the host 11 with the first electronic device based on the correspondence between the first operation hint and the first operation information of the first electronic device. In this case, the immersive VR experience of the user can be maintained during paring the HMD with the accessory devices (e.g., handheld controllers), which improves the user experience.

Figure 3:
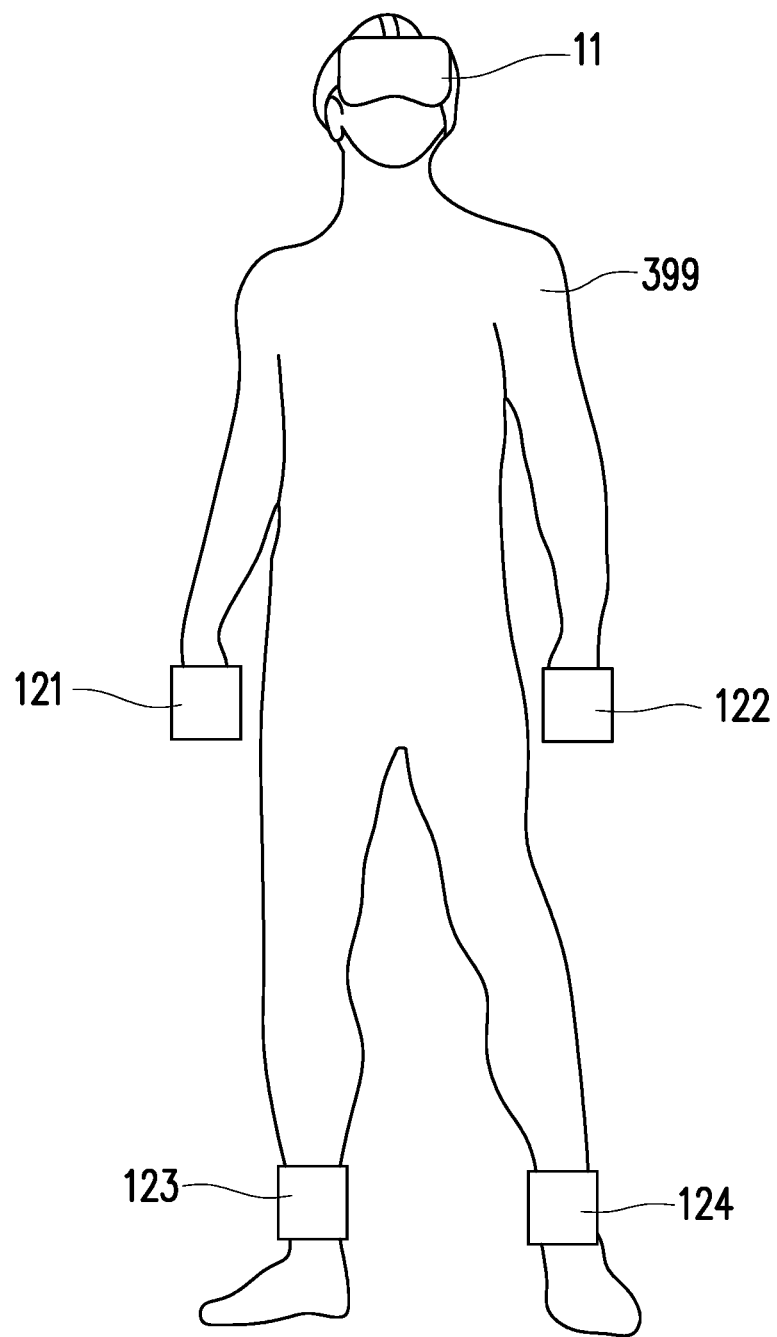
FIG. 3 shows an application scenario according to an embodiment of the disclosure.

For better understanding the concept of the disclosure, FIG. 3 would be used as an example. See FIG. 3, which shows an application scenario according to an embodiment of the disclosure. In FIG. 3, the host 11 is an HMD worn by the user 399. The electronic devices 121, 122 are handheld controllers respectively held by the right hand and the left hand of the user 399. The electronic devices 123, 124 are smart ankle trackers respectively worn on the right leg and the left leg of the user 399.

In the embodiment, assuming that the host 11 has establish a connection with each of the electronic devices 121-124 based on the teachings in the above. That is, the host 11 can receive the operation information of each of the electronic devices 121-124 via the corresponding connection.

In the embodiment, when the system/application/service/game on the host 11 wants to guide the user 399 to pair the host 11 with the specific electronic device in the right hand of the user 399, the host 11 may show the first operation hint to instruct the user 399 to, for example, cover the camera of the specific electronic device in the right hand of the user 399. Accordingly, the user 399 would cover the camera of the electronic device 121 in the right hand thereof. In this case, the host 11 would determine that only the operation information (e.g., the images) received from the electronic device 121 matches and/or corresponds to the first operation hint (i.e., the result of the image recognition indicates that the camera of the electronic device 121 is covered). Therefore, the host 11 can pair with the electronic device 121 and assign the electronic device 121 to be corresponding to the right hand of the user 399. In this case, the user may interact with the service provided by the host 11 via moving the electronic device 121, such as controlling the VR avatar shown in the VR content provided by the host 11, but the disclosure is not limited thereto.

In the embodiment, when the host 11 wants to pair with the specific electronic device in the left hand of the user 399, the host 11 may show the first operation hint to instruct the user 399 to, for example, press the first specific button on the specific electronic device in the left hand of the user 399. Accordingly, the user 399 would press the second specific button (which corresponds to the first specific button) on the electronic device 122 in the left hand thereof. In this case, the host 11 would determine that only the button event received from the electronic device 122 indicates that the second specific button on the electronic device 122 is triggered as instructed by the first operation hint. Therefore, the host 11 can pair with the electronic device 122 and assign the electronic device 122 to be corresponding to the left hand of the user 399.

In the embodiment, when the host 11 wants to pair with the specific electronic device worn by the right leg of the user 399, the host 11 may show the first operation hint to instruct the user 399 to, for example, kicking the right leg.

In this case, the host 11 would determine that only the operation information (e.g., the motion data) received from the electronic device 123 matches and/or corresponds to the moving pattern of kicking. In this case, the host 11 can pair with the electronic device 123 and assign the electronic device 123 to be corresponding to the right leg of the user 399.

In the embodiment, when the host 11 wants to pair with the specific electronic device worn by the left leg of the user 399, the host 11 may show the first operation hint to instruct the user 399 to, for example, circling the left leg. In this case, the host 11 would determine that only the operation information (e.g., the motion data) received from the electronic device 124 matches and/or corresponds to the moving pattern of circling. In this case, the host 11 can pair with the electronic device 124 and assign the electronic device 124 to be corresponding to the left leg of the user 399.

The disclosure further provides a computer readable storage medium for executing the method for pairing devices. The computer readable storage medium is composed of a plurality of program instructions (for example, a setting program instruction and a deployment program instruction) embodied therein. These program instructions can be loaded into the host 11 and executed by the same to execute the method for pairing devices and the functions of the host 11 described above.

In summary, the embodiments of the disclosure provide a novel and convenient way to pair the host with the electronic device based on the correspondence between the operation hint and the operation information of the electronic device. In this case, the immersive VR experience of the user can be maintained during paring the HMD with the accessory devices (e.g., handheld controllers), which improves the user experience.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for pairing devices, the devices including a host and an electronic device, wherein the host is a head-mounted display that provides a reality service, the method comprising:

in response to determining a pairing function of the host is triggered, scanning, by the host, for a broadcast signal transmitted by the electronic device;

in response to determining that the broadcast signal from the electronic device is scanned, establishing, by the host, a first connection with the electronic device;

providing, by the host, a first operation hint in visual content of the reality service, wherein the visual content includes a virtual reality avatar, and the virtual reality avatar has a body part corresponding to a first object part, wherein the first operation hint in visual content is used to instruct a user to move a specific electronic device on the first object part according to a specific moving pattern, the first object part corresponding to the body part of the user wearing the host;

receiving, by the host, a first operation information from the electronic device through the first connection, wherein the first operation information is motion data detected by the electronic device;

in response to determining that a moving pattern formed based on the motion data detected by the electronic device matches the specific moving pattern with the specific electronic device on the first object part as instructed by the first operation hint, determining, by the host, that the first operation information corresponds to the first operation hint, pairing, by the host, with the electronic device, and assigning the electronic device to be corresponding to the first object part; and controlling, by the host, the body part of the virtual reality avatar according to a movement of the electronic device.

2. The method according to claim 1, comprising:
in response to determining that a pairing button on the host is triggered, determining, by the host, that the pairing function of the host is triggered.

3. The method according to claim 1, wherein the broadcast signal comprises identification information of the electronic device.

4. The method according to claim 3, wherein the identification information comprises a wireless fidelity internet protocol address of the electronic device or a Bluetooth medium access control address of the electronic device.

5. The method according to claim 1, wherein the first operation hint instructs to press a first specific button on a specific electronic device, and the first operation information comprises a button event provided by the electronic device.

6. The method according to claim 5, comprising:
in response to determining that the button event indicates that a second specific button on the electronic device is triggered, determining, by the host, that the first operation information corresponds to the first operation hint, wherein the second specific button on the electronic device corresponds to the first specific button on the specific electronic device.

7. The method according to claim 1, wherein the first operation hint instructs to perform a specific operation to a camera of a specific electronic device, and the first operation information comprises a plurality of images captured by a first camera of the electronic device.

8. The method according to claim 7, comprising:
performing an image recognition on the images provided by the electronic device;
in response to determining that a result of the image recognition indicates that an operation performed to the first camera corresponds to the specific operation, determining, by the host, that the first operation information corresponds to the first operation hint.

9. The method according to claim 7, wherein the specific operation comprises covering the camera of the specific electronic device.

10. An electronic system for pairing between a host and an electronic device, where the host is a head-mounted display that provides a reality service, and the electronic system comprises:
the host, configured to perform:
in response to determining a pairing function of the host is triggered, scanning for a broadcast signal transmitted by the electronic device;
in response to determining that the broadcast signal from the electronic device is scanned, establishing a first connection with the electronic device;
providing a first operation hint in visual content of the reality service, wherein the visual content includes a virtual reality avatar, and the virtual reality avatar has a body part corresponding to a first object part, wherein the first operation hint in visual content is used to instruct a user to move a specific electronic device on the first object part according to a specific moving pattern, the first object part corresponding to the body part of the user wearing the host;

receiving a first operation information from the electronic device through the first connection, wherein the first operation information is motion data detected by the electronic device;
in response to determining that a moving pattern formed based on the motion data detected by the electronic device matches the specific moving pattern with the specific electronic device on the first object part as instructed by the first operation hint, determining, by the host, that the first operation information corresponds to the first operation hint, pairing with the electronic device, and assigning the electronic device to be corresponding to the first object part; and
controlling, by the host, the body part of the virtual reality avatar according to a movement of the electronic device.

11. The electronic system according to claim 10, wherein the first operation hint instructs to press a first specific button on a specific electronic device, and the first operation information comprises a button event provided by the electronic device, wherein the host perform:
in response to determining that the button event indicates that a second specific button on the electronic device is triggered, determining, by the host, that the first operation information corresponds to the first operation hint, wherein the second specific button on the electronic device corresponds to the first specific button on the specific electronic device.

12. The electronic system according to claim 10, wherein the first operation hint instructs to perform a specific operation to a camera of a specific electronic device, and the first operation information comprises a plurality of images captured by a first camera of the electronic device, wherein the host performs:
performing an image recognition on the images provided by the electronic device;
in response to determining that a result of the image recognition indicates that an operation performed to the first camera corresponds to the specific operation, determining, by the host, that the first operation information corresponds to the first operation hint.

13. The electronic system according to claim 10, further comprising the electronic device, wherein the electronic device performs:
broadcasting the broadcast signal, wherein the broadcast signal comprises identification information of the electronic device;
establishing the first connection with the host; and
transmitting the first operation information to the host through the first connection.

14. The electronic system according to claim 13, wherein the electronic device broadcasts the broadcast signal after a booting procedure is finished.

15. A non-transitory computer readable storage medium for pairing between a host and an electronic device, where the host is a head-mounted display that provides a reality service, the computer readable storage medium recording an executable computer program, the executable computer program being loaded by the host to perform steps of:
in response to determining a pairing function of the host is triggered, scanning for a broadcast signal transmitted by the electronic device;
in response to determining that the broadcast signal from the electronic device is scanned, establishing a first connection with the electronic device;

providing a first operation hint in visual content of the reality service, wherein the visual content includes a virtual reality avatar, and the virtual reality avatar has a body part corresponding to a first object part, wherein the first operation hint in visual content is used to instruct a user to move a specific electronic device on the first object part according to a specific moving pattern, the first object part corresponding to the body part of the user wearing the host;

receiving a first operation information from the electronic device through the first connection, wherein the first operation information is motion data detected by the electronic device;

in response to determining that a moving pattern formed based on the motion data detected by the electronic device matches the specific moving pattern with the specific electronic device on the first object part as instructed by the first operation hint, determining, by the host, that the first operation information corresponds to the first operation hint, pairing with the electronic device, and assigning the electronic device to be corresponding to the first object part; and controlling, by the host, the body part of the virtual reality avatar according to a movement of the electronic device.

* * * * *